United States Patent [19]
Underhill et al.

[11] Patent Number: 5,259,167
[45] Date of Patent: Nov. 9, 1993

[54] CONTROL MECHANISM FOR ROUND BALER WEB CUTTING APPARATUS

[75] Inventors: Kenneth R. Underhill, Strasburg; Edwin O. Margerum, Paradise, both of Pa.

[73] Assignee: Ford New Holland, Inc., New Holland, Pa.

[21] Appl. No.: 931,801

[22] Filed: Aug. 18, 1992

[51] Int. Cl.$^5$ .............................. B65B 11/04
[52] U.S. Cl. .............................. 53/118; 53/587; 53/389.3
[58] Field of Search ............... 53/77, 118, 587, 389.3

[56] References Cited

U.S. PATENT DOCUMENTS

| | | | |
|---|---|---|---|
| 4,409,784 | 10/1983 | Van Ginhoven | 53/118 X |
| 4,563,854 | 1/1986 | Ackerman | 53/118 |
| 4,578,932 | 4/1986 | Cooke | 53/587 |
| 4,787,193 | 11/1988 | Verhulst | 53/118 |
| 5,079,898 | 1/1992 | Springs | 53/587 X |

Primary Examiner—John Sipos
Attorney, Agent, or Firm—Frank A. Seemar; Larry W. Miller

[57] ABSTRACT

An agricultural baler for making cylindrical bales of crop material having a sledge assembly moveable between bale starting and full bale positions. The sledge assembly includes a plurality of rollers which cooperate with an apron to define a bale forming chamber. A dispensing mechanism is carried on the sledge assembly for dispensing web material into the bale forming chamber whereupon it is wrapped circumferentially around a cylindrical package of crop material. A net supply assembly is associated with the dispensing mechanism to provide net for feeding into the bale chamber via the dispensing mechanism. Included along the feed path of the net is a net severing assembly for cutting the net after it has been wrapped around the cylindrical hay package. The net severing assembly includes a free falling cutting element for operatively engaging the net prior to entry into the chamber. A control arrangement prevents the severing assembly from operating at a time when it would have a deleterious effect on baler operation.

4 Claims, 9 Drawing Sheets

CONTROL MECHANISM FOR ROUND BALER WEB CUTTING APPARATUS

FIELD OF THE INVENTION

This invention relates generally to a baler for forming cylindrical bales of crop material, commonly referred to as a round baler. More particularly, this invention pertains to a mechanism for controlling round baler web cutting apparatus.

BACKGROUND OF THE INVENTION

Prior art round balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground, as the baler travels across the field, and is fed into a fixed or expandable chamber where it is rolled up to form a compact cylindrical hay package. While still inside the bale forming chamber in its compacted form, the outer surface of the package is wrapped with twine or web material, such as net, prior to ejecting the wrapped bale from the chamber onto the ground for subsequent handling.

Exemplary of prior art round balers of the general type mentioned above is the baler disclosed in U.S. Pat. No. 4,956,968 issued in the name of K. R. Underhill on Sep. 18, 1990. In this baler an apron consisting of a combination of rolls and belts is used for bale formation. The baler also includes a mechanism for supplying net to a dispensing assembly which in turn feeds the net material into the bale forming chamber for circumferentially wrapping a formed cylindrical package of crop material. The dispensing mechanism includes a net insertion arrangement having a grasping portion for pulling net from the supply mechanism and inserting the free edge, commonly referred to as the tail, into the chamber. Subsequent to wrapping, the net material is severed by a cutting device, comprising an assembly for thrusting a knife edge transversely through the path of the net while net tension is increased causing a severing action as the net is pulled against the knife edge. After the net material is severed, the completed round bale is ejected from the baler by lifting the tail gate which opens the chamber rearwardly and thereby permitting the bale to be discharged onto the ground behind the baler.

Various other cutting arrangements are known in the round baler art, as exemplified by the apparatus disclosed in U.S. Pat. No. 4,597,241, issued Jul. 1, 1986, wherein a pair of opposing knives are used to shear the web material. In another known arrangement a knife strikes an anvil to provide the severing function as depicted in U. S. Pat. No. 4,922,690, issued May 8, 1990. Still another prior art mechanism contemplates a knife that is projected into a recess on the opposite side of the web path to urge the web against a cutting abutment, as shown in U.S. Pat. No. 4,599,844.

In all of the arrangements noted above, regardless of the type of baler involved, it is important that the cutting function be properly coordinated with the other functions of the baler. Coordination is especially critical in balers where the cutting takes place in an area where other mechanisms are functional during different phases of the bale making process. For example, in the baler shown in U.S. Pat. No. 4,956,968 the dispensing mechanism projects through the cutting area during a portion of the time that net is being dispensed into the chamber during the wrapping function. Serious damage would result if the cutting and wrapping functions were initiated at the same time due to a simple malfunction of their respective control mechanisms, operator error, etc.

Another example illustrating the importance of coordination of the various functions is the situation where the cutting assembly commences its function before the net is properly presented for severing, regardless of whether other mechanisms are in the path of the knife. Among the problems presented by this situation would be a ragged uneven cut, cutting before the bale is completely wrapped, a missed cut leading to the necessity of manual intervention and a myriad of other problems that would arise due to the complexities of the sequential nature of the automated steps of the balers of concern.

SUMMARY OF THE INVENTION

An important object of the present invention is to provide an improved control arrangement for a round baler web severing assembly that solves the above problems while still providing a reliable effective mechanism that lends itself to ease of serviceability.

In pursuance of this and other important objects the present invention provides for a baler for making cylindrical bales of crop material of the type having a main frame and a tailgate pivotally connected to the main frame adapted to rotate between closed and open positions relative to the mainframe. Guide means, such as rollers, are operatively mounted on the tailgate and main frame, about which an apron extends to define a bale forming chamber that discharges bales formed therein rearwardly under conditions where the tailgate is rotated to its open position. Also mounted on the main frame is a dispensing mechanism for dispensing a web of net material into the bale forming chamber. The dispensing mechanism has an operative condition during which the net material is circumferentially wrapped around crop material in the bale forming chamber to form a cylindrical bale. Cooperating with the dispensing mechanism is a net severing assembly having cutting means for operatively engaging the web of net prior to entry into the chamber after crop material has been wrapped to form a bale. According to its broadest aspects the present invention contemplates a unique control arrangement for preventing the cutting means from operating under conditions where the dispensing mechanism is in its operative condition. More particularly, the control arrangement comprises first link means operatively coupled to the dispensing mechanism, second link means operatively coupled to the net severing assembly, and an actuator coupled to the first link means for moving the dispensing mechanism to its operative condition. The actuator means is also coupled to the second link means in a manner whereby the cutting means is deterred from engaging the net during the operative condition of the dispensing mechanism.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are

DESCRIPTION OF THE PREFERRED EMBODIMENT

Figure 1:
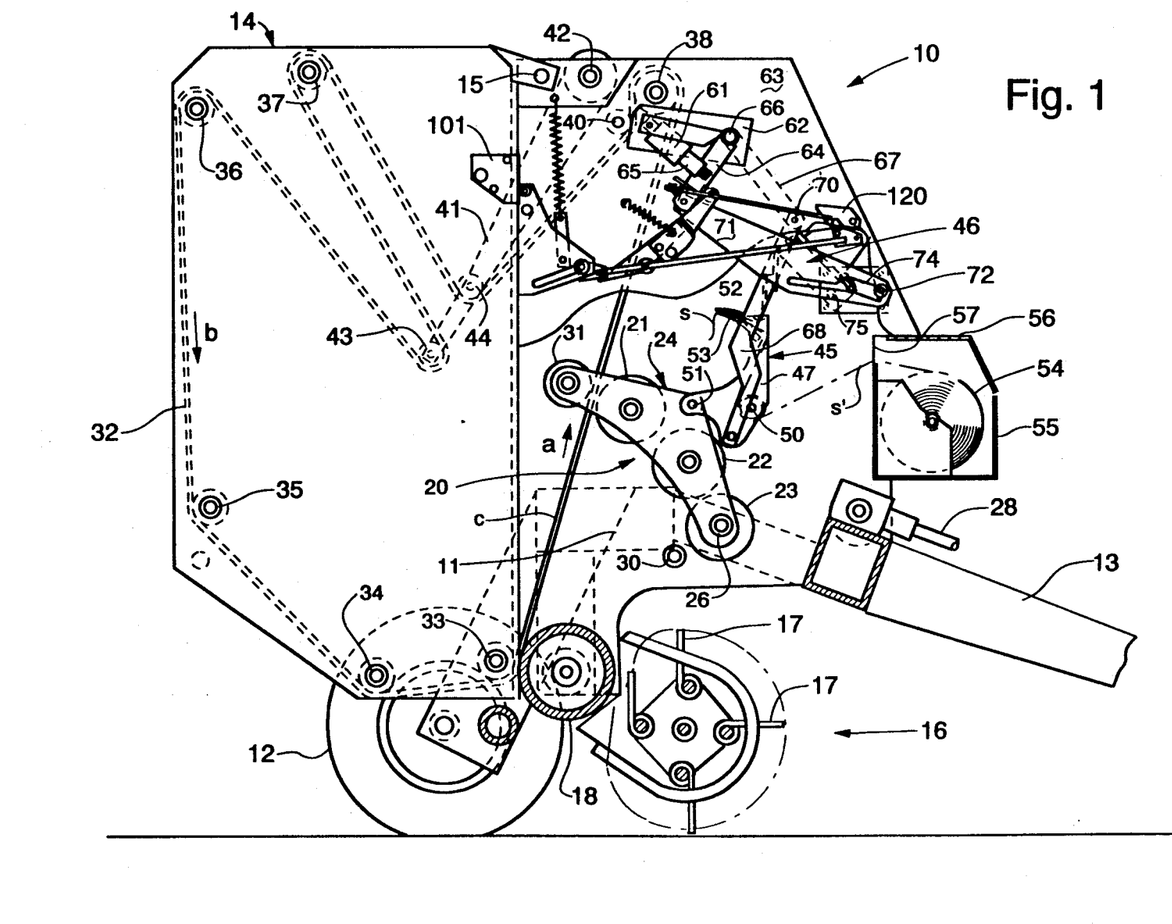
FIG. 1, a diagrammatic side elevational view of a round baler in which the present invention is embodied, shows the elements of the baler in the bale starting position.

Referring now to the drawings for a more detailed description of the preferred embodiment of the invention, FIG. 1 shows a round baler 10 of the type having an expandable chamber defined by belts and rollers, as generally disclosed in U.S. Pat. No. 4,956,958.

Figure 2:
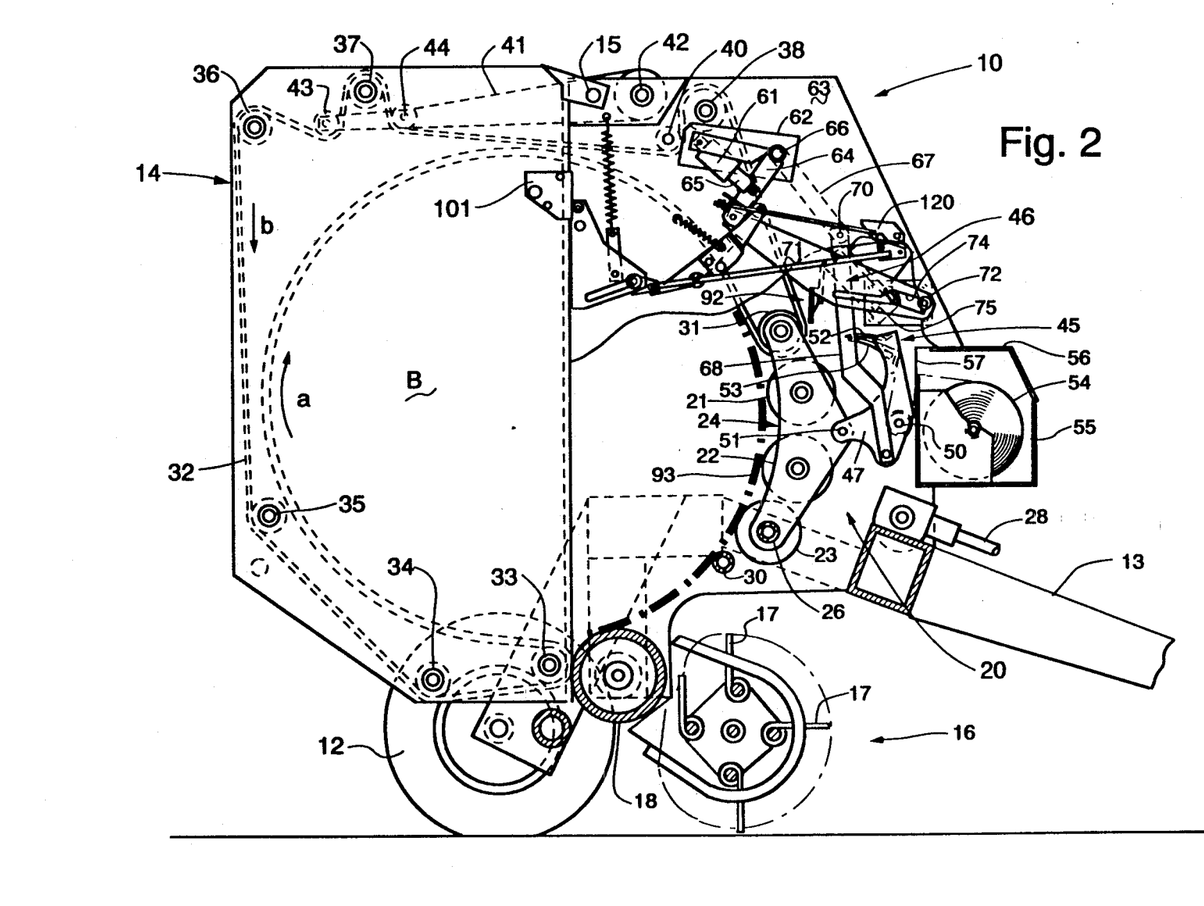
FIG. 2, a diagrammatic side elevational view similar to FIG. 1, shows the elements of the baler in the full bale position.

Round baler 10, which incorporates the preferred embodiment of the present invention, includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, is supported by a pair of suitable wheels (not shown). Pickup 16 includes a plurality of fingers or tines 17 movable in a predetermined path to lift crop material from the ground and deliver it rearwardly toward a floor roll 18, rotatably mounted on main frame 11.

Figure 3:
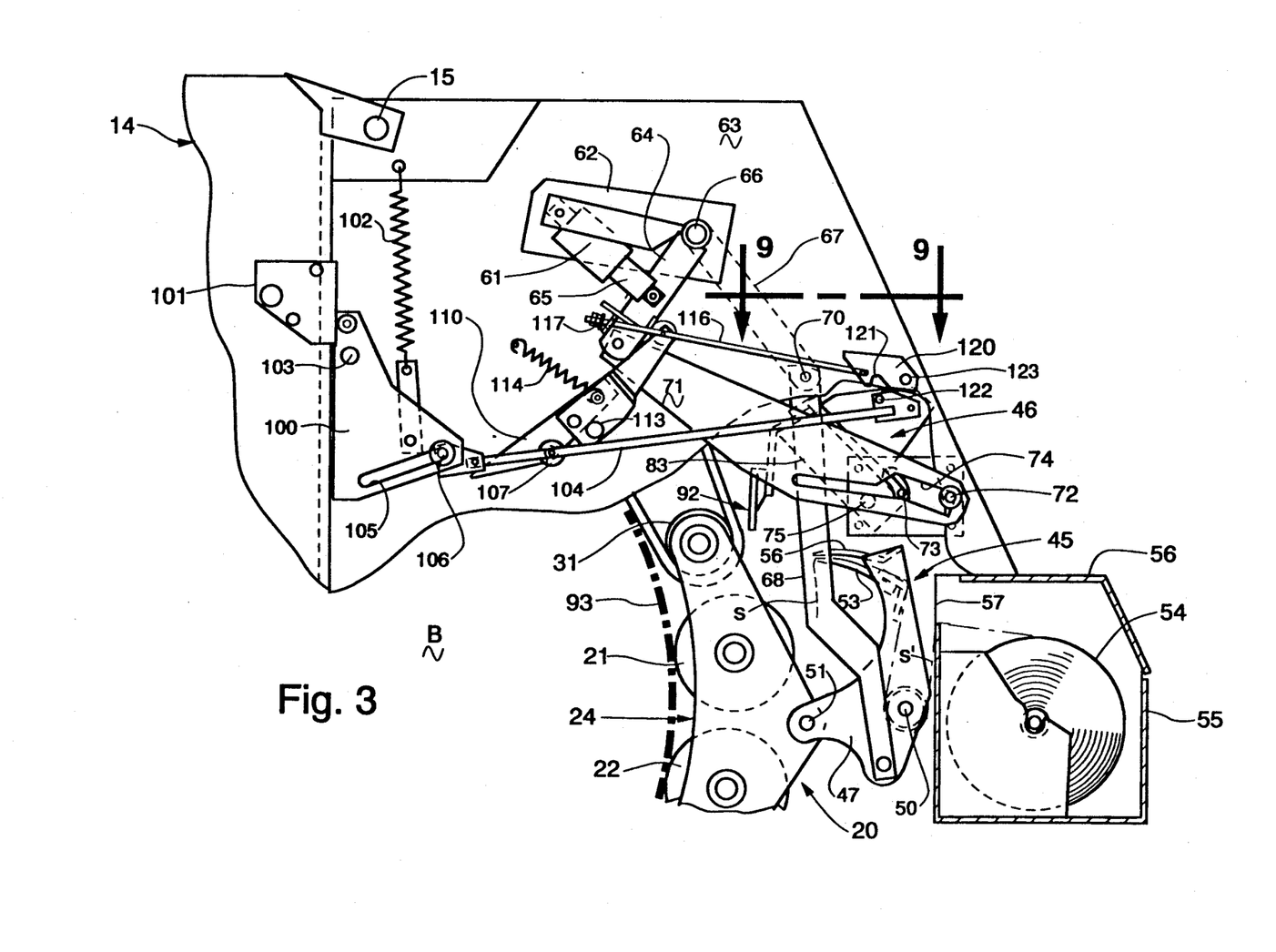
FIG. 3 is a detailed side elevational view of the control arrangement of the baler shown in FIGS. 1 and 2.

The bale forming chamber is defined partly by a sledge assembly 20 comprising a plurality of rollers 21, 22, 23 extending transversely of the main frame 11 in the arcuate arrangement seen in FIGS. 1-3. Rollers 21, 22, 23 are journalled at their respective ends in a pair of spaced apart roll carrying arms 24, one of which is shown. These arms are pivotally mounted inside main frame 11 on stub shafts 26 for providing movement of sledge assembly 20 between the bale starting position shown in FIG. 1 and the full bale position shown in FIG. 2. Rollers 21, 22, 23 are driven in a counter-clockwise direction by conventional means (for example, chains and sprockets or gears) connected with a drive shaft 28 which is in turn connected to the power take-off of a tractor. A starter roll 30, located adjacent roller 23, is also driven counter-clockwise. A freely rotatable idler roller 31, carried by arms 24, 25, moves in an arcuate path with sledge assembly 20 as it moves between its bale starting position (FIG. 1) and full bale position (FIG. 2).

The bale forming chamber is further defined by a conventional apron 32 comprising a plurality of continuous side-by-side belts supported by guide rolls 33, 34, 35, 36, 37 which are rotatably mounted in tailgate 14. Apron 32 is also supported on a drive roll 38, rotatably mounted on main frame 11. Although apron 32 passes between roller 21 on sledge assembly 20 and idler roller 31, it is only in engagement with idler roller 31 and not roller 21 which is located in close proximity to the apron belts and serves the purpose of striping crop material from the belts, in addition to its bale forming function. Suitable coupling means (not shown) connected to drive shaft 28 provide rotation of drive roll 38 in a direction causing movement of apron 32 along the path indicated generally by arrows a and b in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2, respectively. Take up arms 41 carry additional guide rolls 43, 44 for supporting apron 32. Resilient means such as coil springs (not shown) are provided to normally urge take up arms 41 toward their inner positions (FIG. 1).

When the elements of round baler 10 are disposed as shown in FIG. 1 with tailgate 14 closed, an inner course c of apron 32 extends between lower front guide roll 33 and idler roll 31. Rollers 21, 22, 23 are inclined rearwardly on sledge assembly 20 to define with course c the initial bale forming chamber, or as sometimes referred to, the core starting chamber. Apron inner course c forms the rear wall of the chamber while the inwardly facing peripheral surfaces of rollers 21, 22, 23 define in a general manner a rearwardly inclined cooperating front wall. Floor roll 18 defines the bottom of the chamber and starter roller 30, spaced from floor roll 18, provides a throat or inlet for the chamber, through which crop material is fed.

As round baler 10 is towed across a field, pickup tines 17 lift crop material from the ground and deliver it through the inlet and thence into the bale forming chamber. The crop material is carried rearwardly by floor roll 18 into engagement with apron inner course c (FIG. 1) which urges it upwardly and slightly forwardly into engagement with rollers 21, 22, 23. In this manner crop material is coiled in a clockwise direction as viewed in FIG. 1 to start a bale core. Continued feeding of crop material into the bale forming chamber by pickup tines 17 causes the apron inner course c to expand in length around a portion of the circumference of the bale core as the diameter increases. Take up arms 41 rotate from their inner position shown in FIG. 1 toward their outer position shown in FIG. 2 to provide for expansion of the inner course of the apron in a well known manner, i.e., in effect the outer course of the belts of apron 32 are diminished in length while the inner courses increase a like amount. After a bale has been formed and wrapped with web material, tailgate 14 is opened and the bale is ejected rearwardly. Subsequent closing of tailgate 14 returns the apron inner and outer courses of the belts of apron 32 to the locations shown in FIG. 1, and round baler 10 is ready to form another bale.

During formation of a bale, sledge assembly 20 also moves between a bale starting position (FIG. 1) to a full bale position (FIGS. 2 and 3). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 31 and apron 32 during formation of a bale. Sledge assembly 20 is pushed outwardly towards its full bale position during bale formation as the crop material expands against the rollers and is pulled inwardly by apron 32 to the position shown in FIG. 1 during bale ejection without utilizing any additional mechanisms.

No turning to the bale wrapping system with which the present invention is operative, FIG. 1 shows a net dispensing mechanism 45 pivotally mounted on sledge assembly 20 and an interrelated cutting assembly 46 (phantom outline) pivotally mounted between the side walls 63 on main frame 11. As best seen in FIG. 3, dispensing mechanism 45 comprises a pair of levers 47 spaced apart, inter alia, by a transverse idler roll 50. Levers 47 are rotatably supported on a cross tube 51 (FIG. 1) that extends between arm 24 of sledge assembly 20. The dispensing mechanism 45 further comprises transverse clamping members 52, 53 also extending between levers 47 and arranged to dispense into the forming chamber web material s, such as net or the like, from a supply roll 54 disposed in a container 55 carried on baler main frame 11. Container 55 has an access lid 56 to accommodate the placement or removal of supply roll 54. Clamping members 52, 53 may be mounted between levers 47 by bars such as those shown in U.S. Pat. No. 5,036,642, issued Aug. 6, 1991, which clamping structure and mounting arrangement are hereby incorporated by reference. Thus, web material s, s' is pulled from supply roll 54 via a slot 57 and guided around roller 50 to clamping members 52, 53 of dispensing mechanism 45.

Referring now to FIG. 3, an electro-mechanical control system is shown for sequentially actuating various elements of the baler including net dispensing mechanism 45 and cutting assembly 46. Dispensing mechanism 45 is shown in a non-operative retracted position, as also shown in FIG. 2, and cutting assembly 46 is shown in its latched position.

The control system includes an actuator 61, pivotally mounted to plate 62, which is affixed to the outer surface of sidewall 63 of main frame 11. A link member 64, pivotally attached to actuator element 65, is pivoted about fixed pivot pin 66 between the retracted position shown in FIGS. 1-3 and the extended position shown in FIG. 4. Affixed to and adapted for rotation with a pin 66 and inwardly of side wall 63 is lever 67. A net dispensing actuator arm 68 is pivotally connected to lever 67 via pin 70 inwardly of wall 63, whereby actuator arm 68 moves to the upward position shown in FIG. 4 under conditions where actuator element 65 is extended. When actuator element 65 is retracted, arm 68 is moved downwardly and net dispensing mechanism 45 is moved to the retracted non-operative position (FIG. 3).

Pivotally attached to the lower end of link member 64 is a transverse control arm 71 which reciprocates in a generally for and aft direction in response to the position of actuator element 65. The right end of control arm 71 is supported by flanged roller 72 affixed to side wall 63 and extending through control arm slot 74. Knife control roller 73 also extends through control arm slot 74 in an operative manner discussed in further detail below. Inward of control arm is net cutting assembly 46 mounted to pivot around stub shaft 75 affixed to plate 76 secured to the inside surface of side wall 63.

Net cutting assembly 46 can be referred to, interchangeably, as a severing assembly to more generally define a mechanism capable of performing the various types of known severing functions. It includes a pair of knife side plates 83 (only one shown) rotatably supported to pivot about stub shaft 75. A cutting means 92 is carried by and extends transversely between knife side plates 83 in a generally downward direction. It is operative to pass to pass through the path along which net material is dispensed by dispensing mechanism 45, under conditions where the entire assembly 46 is dropped. A net cutting assembly that operates in the same general manner is shown in U.S. Pat. No. 4,956,968, referred to above. The cutting assembly geometry is such that cutting means 92 is permitted to pass through the net path a distance sufficient to assure effective severing.

Figure 9:
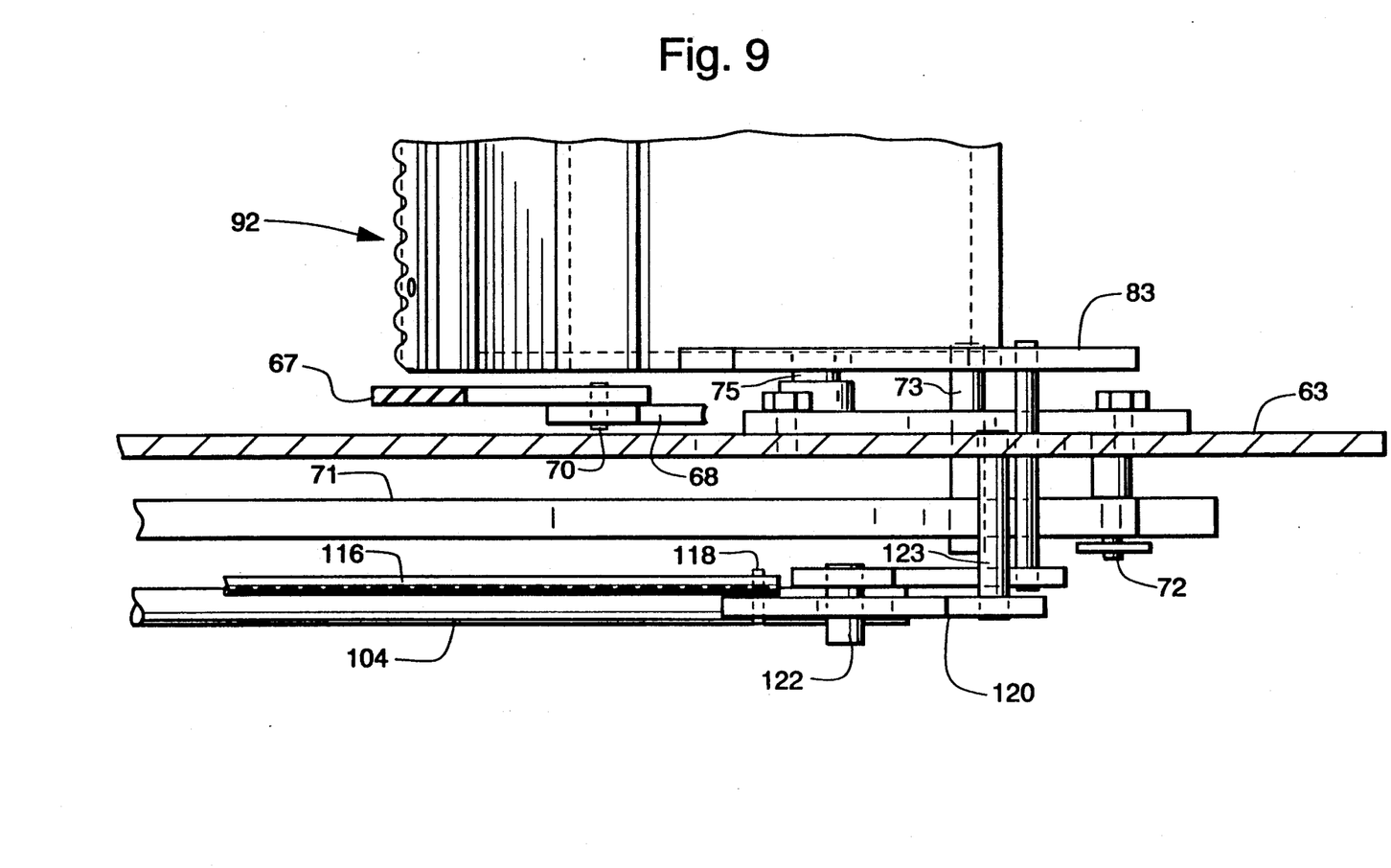
FIG. 9 is a sectional view taken in the direction of arrows 9—9 in FIG. 3.

FIGS. 3–5, 7 and 8 depict the control system in various steps of its sequential operation. Before describing the various steps, the specific knife control elements shown in all the FIGS. will be described with specific reference to FIG. 6. The elevational views all show the same elements, the relationship of which is more clearly shown in FIG. 9. The solid lines in FIG. 6 depict the knife control elements prior to cutting. A slotted arm 100 is held against a tailgate push plate 101 by a spring 102, anchored on sidewall 63 and urging arm 100 in a counterclockwise direction about pivot 103.

Affixed to knife side plate 83 is a reset rod 104 extending rearwardly to slideably engage slot 105 in slotted arm 100 via a flanged roller 106. A latch pin 107 extends from reset rod 104 for cooperative engagement with a notch 108 in a latch plate 110. A camming roller 111 is rotateably mounted to latch plate 110 for operative engagement with a camming element 112 affixed to link member 64. Latch plate 110 pivots about a pin 113 under the influence of a spring 114 anchored at its fixed end to wall 63.

Also affixed to link member 64 is a collar element 115 having an aperture through which a trip rod 116 slideably traverses, the limit of which traversal is controlled by an adjustable stop member 117. Pivotally secured by pivot pin 118 to the forward end of trip rod 116 is a trip latch member 120 comprising a locking notch 121 which cooperatively receives a lock pin 122 extending from knife side plate 83. Trip latch member 120 is pivotally mounted on side wall 63 at pivot 123.

Before describing the specific operation of the control system, the general operation of the actuators, linkages and various other drive mechanisms and the like of baler 10, will be described. First turning to the point at which bale B (FIGS. 2 and 3) has been formed and is ready to be wrapped with net material, electric actuator 61 is activated while apron 32 continues to rotate bale B in a clockwise direction as viewed in FIG. 2. The outer surface of bale B is generally illustrated by heavy broken lines 93. Actuator element 65 of electric actuator 61 drives control arm 71 from left to right and net dispensing actuator arm 81 from the position of FIG. 3 to the position of FIG. 4. This rotates the dispensing mechanism 45 from the position shown in FIG. 3 to position shown in FIG. 4. As the dispensing mechanism 45 moves toward its dispensing position, the cutting assembly 46 is held in the non operative position shown in FIG. 4 and clamping members 52, 53 move into a gap between roller 21 and apron 32, whereupon tail s is dragged downwardly and caught in the nip between roller 21 and bale B which are rotating in opposite directions. The net material is then dispensed along a path from the supply roll 54 via slot 57, around idler roller 50, between clamping members 52, 53, and then through the gap into the bale forming chamber where it is wrapped circumferentially around bale B while the bale continues to be rotated by apron 32.

Figure 4:
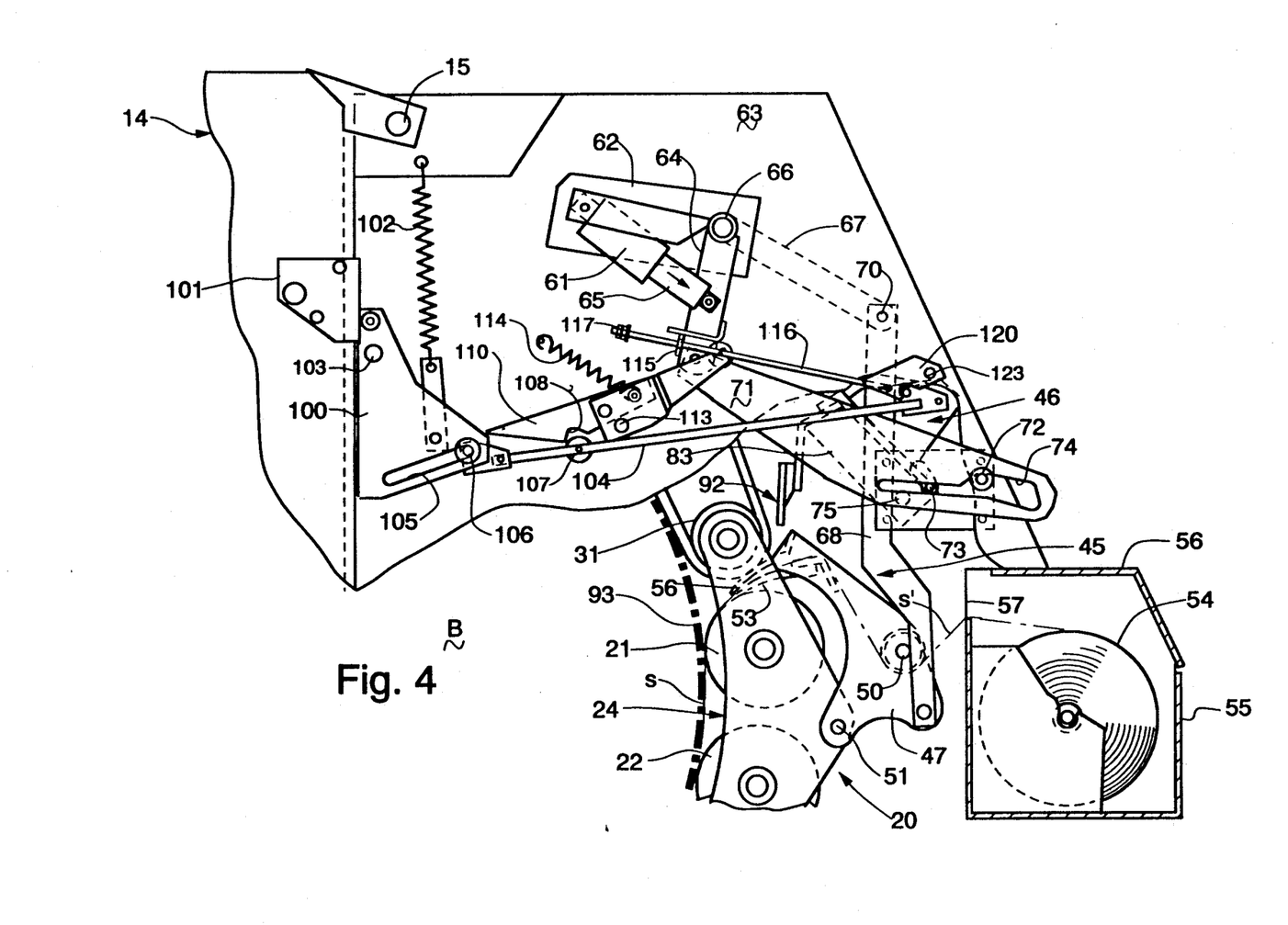
FIG. 4 is a side elevational view of the control arrangement shown in FIG. 3 with the dispensing mechanism in its retracted position.

After bale B has been wrapped with one or more layers of the net material, electric actuator 61 is reversed thereby moving dispensing mechanism 45 from the position shown in FIG. 3 to the position shown in FIG. 4. When dispensing mechanism 45 is subsequently retracted, net cutting assembly 46 is rotated counterclockwise (FIG. 7) so that cutting means 92 is dropped downwardly at the appropriate time into contact with the expanse of net material extending from clamping members 52, 53 of dispensing mechanism 45 to the periphery of roll 21. More specifically, knife side plates 83 rotate about stub shaft 75 under conditions where knife control roller 73 is free to move upwardly until it reaches the upper limit of slot 74 in transverse control arm 71. Cutting means 92 drops and severs the net material leaving a succeeding tail which is gripped by clamping members 52, 53 for future insertion into the bale forming chamber.

Now turning to the specific operational sequencing of the knife control system depicted in FIG. 6, where the elements are shown in solid lines just prior to knife drop and in phantom outline at the instant at which knife drop occurs, the steps of the control system will be described as they progress from FIGS. 3 through 5 and thence 6 through 8. In FIG. 3 (an enlargement of the system of FIG. 2) the bale B has just been completed and actuator 61 has not been energized. In FIG. 4 actuator 61 has not been energized and dispensing mechanism 45 is rotated to its operative position. Element 112 engages cam roller 111 and latch plate notch 108 is lifted from pin 107 to unlatch knife assembly 46; however, knife drop is prevented by virtue of lock pin 122 engaged in slot 74 and trip latch 120 engaging lock pin 122. The latter occurs when collar element 115 moves away from stop 117 allowing trip rod 116 to drop to its latching position shown in solid lines in FIG. 6.

Figure 5:
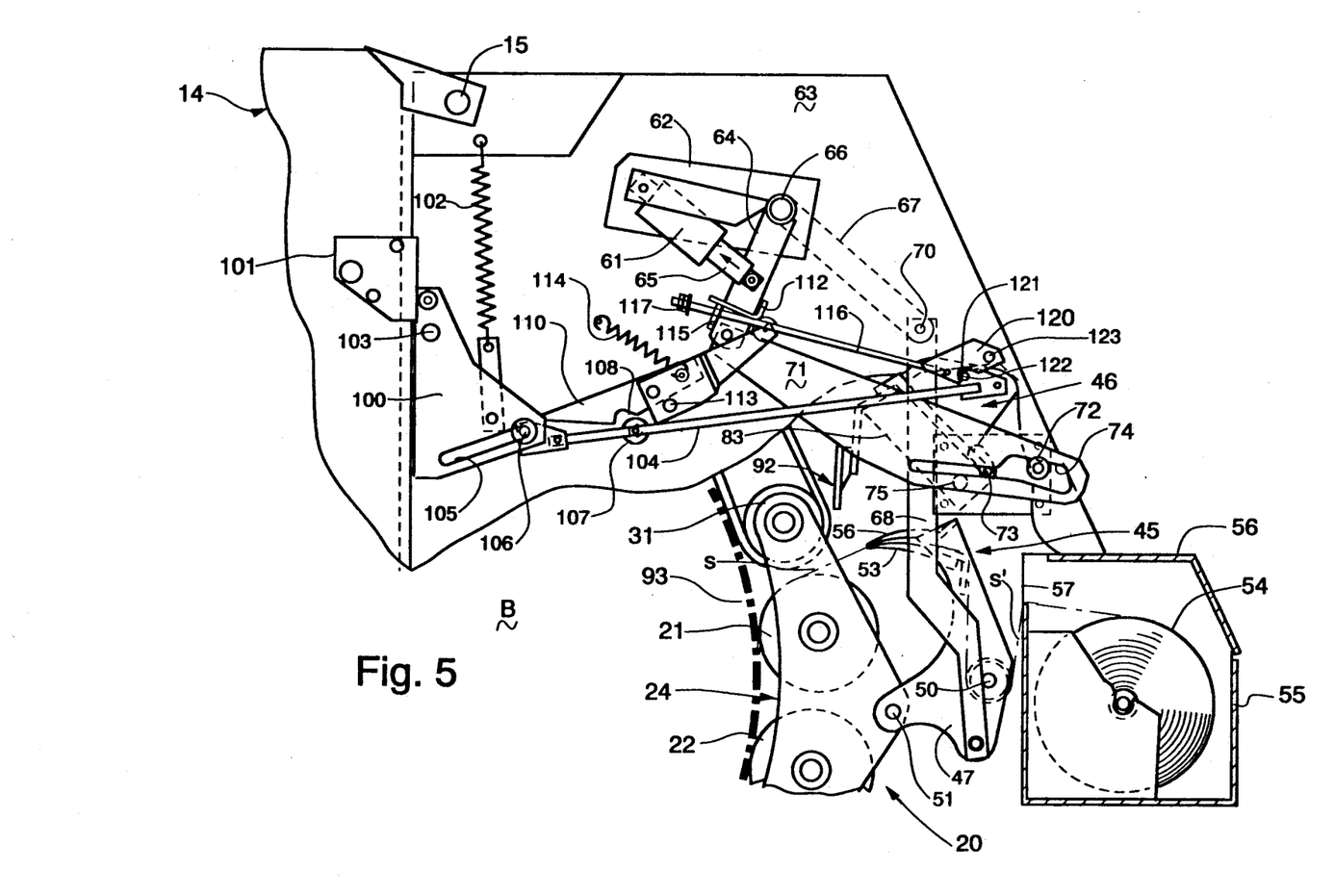
FIG. 5 is a side elevational view of the control arrangement shown in FIG. 3 with the dispensing mechanism shown in its operative condition.
Figure 6:
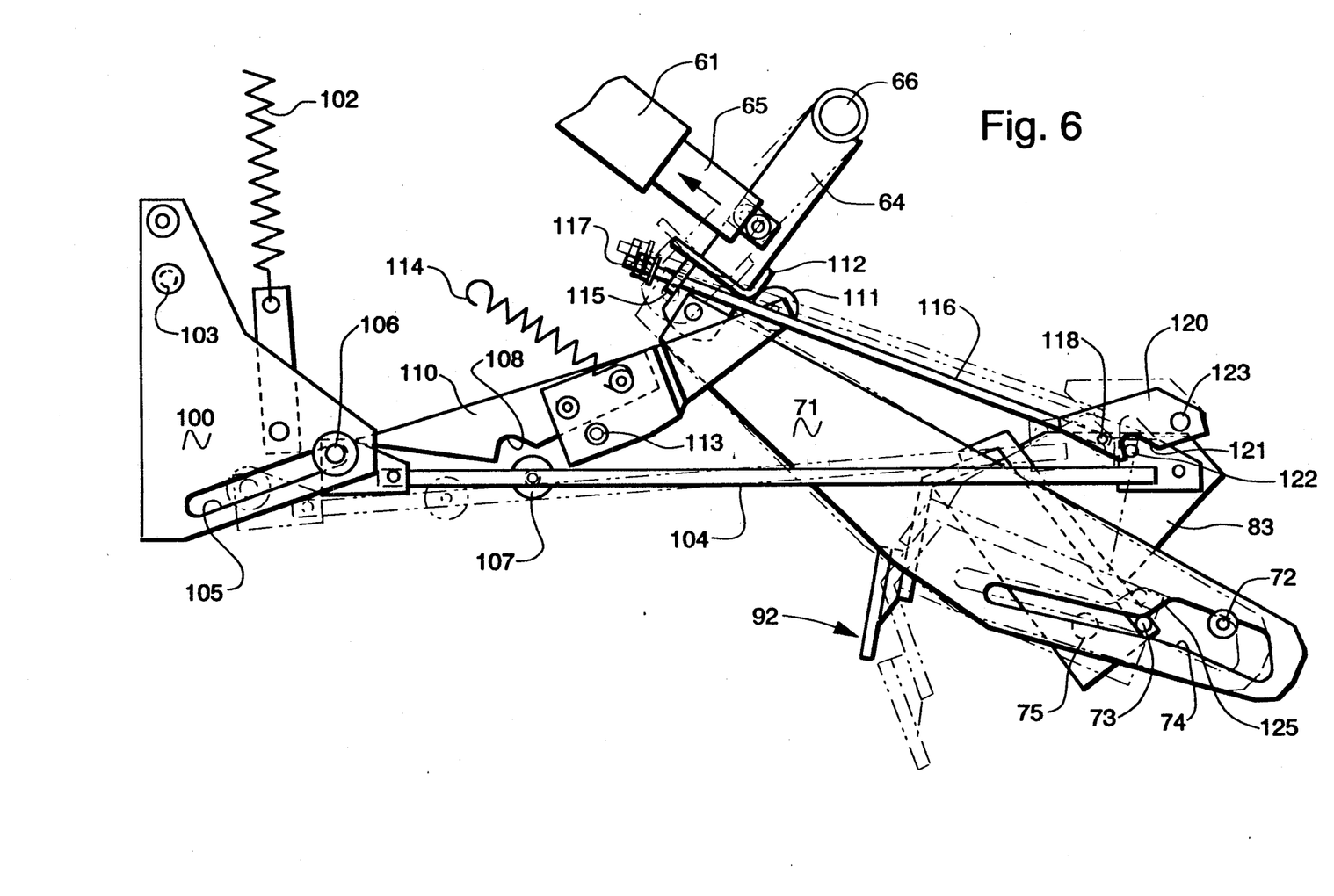
FIG. 6 is a side elevational view showing an enlargement of a portion of the linkage of the control arrangement.

FIG. 5 shows actuator 61 retracting element 65 causing mechanism 45 to be retracted with net s still being dispensed around bale B. Trip latch 120 is still engaged with lock pin 122, holding cutting assembly 46 in its inoperative condition.

Figure 7:
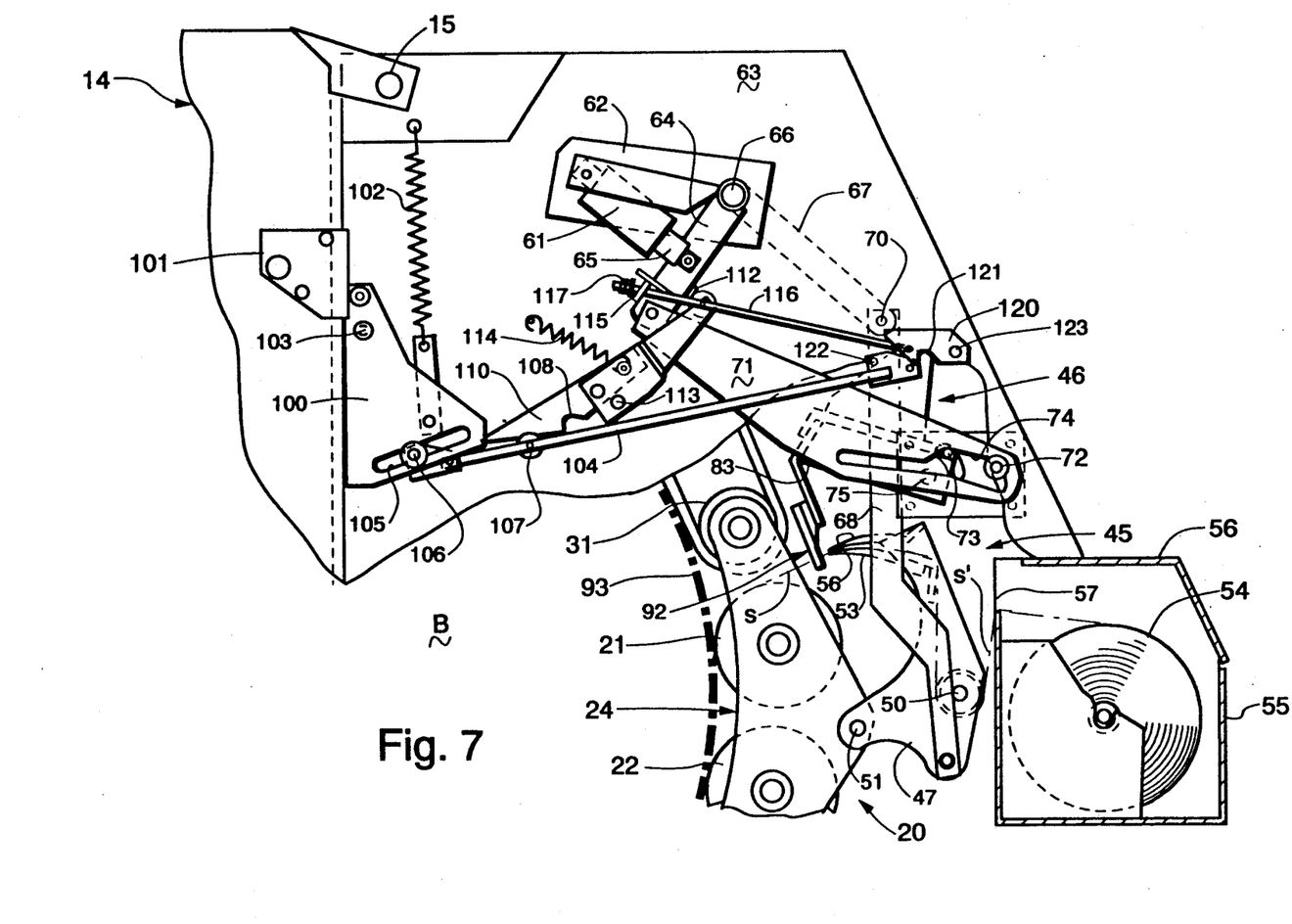
FIG. 7 is a side elevational view of the control arrangement shown in FIG. 3 with the cutting means shown in the dropped position.
Figure 8:
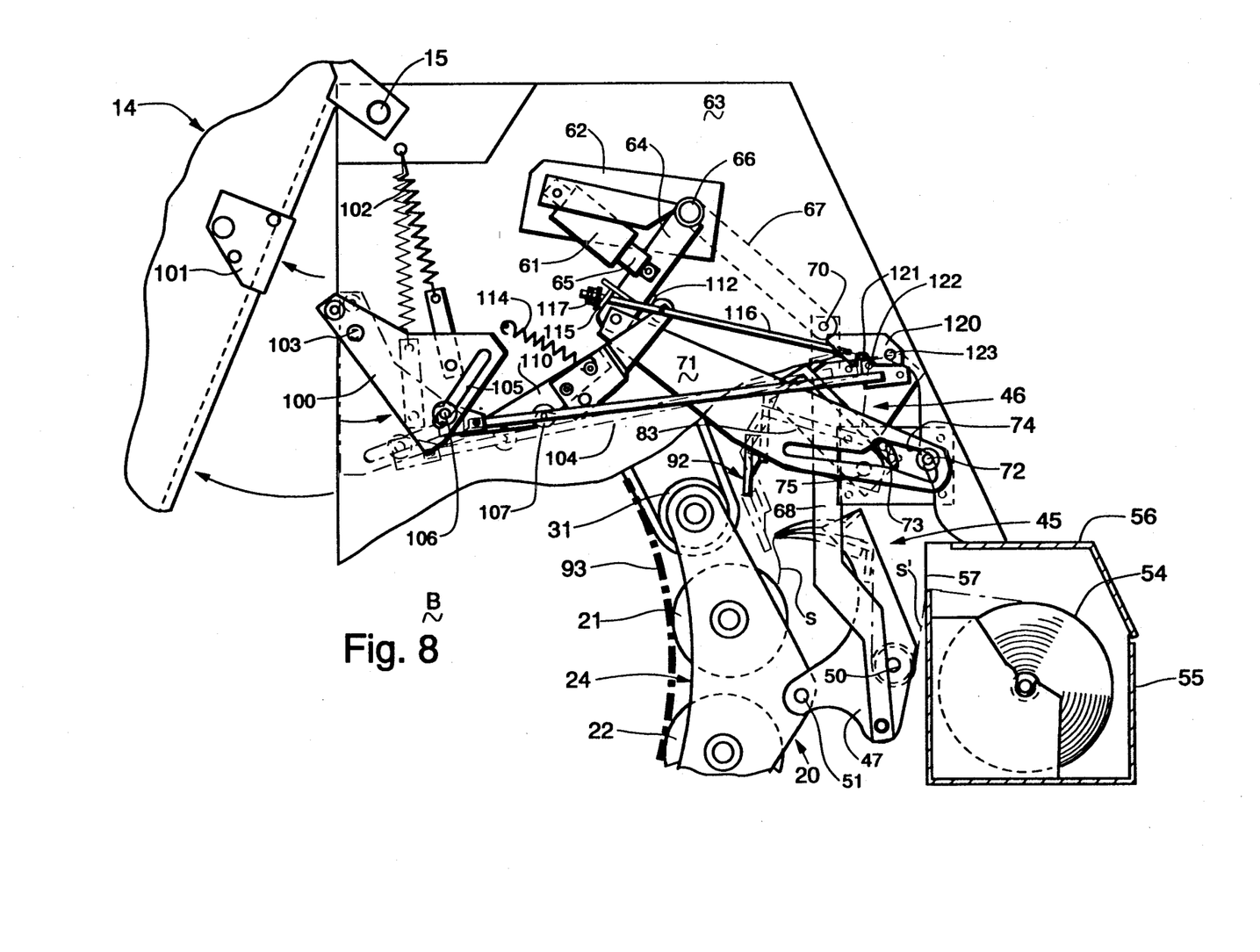
FIG. 8 is a side elevational view of the control arrangement shown in FIG. 3 with the baler tail gate shown in the open position.

In FIG. 7 actuator 71 is fully retracted and knife 92 has been dropped into net s severing it rearward of dispensing assembly 45. Flanged roller 106 is moved rearwardly by virtue of the knife drop and pin 107 is not aligned with notch 108 in latch plate 110. Control arm 71 is its extreme left position with flanged support roller at the right end of the enlarged portion of slot 74 and pin 73 at the left end thereof.

After the net is severed, tailgate 14 opens (FIG. 8) to discharge bale B removing push plate 101 from engagement with slotted arm 100 causing rotation about pivot 103. Reset rod 104 is thrusted to the position shown which moves cutting assembly 46 back to its reset position and holds it there until the tailgate closes. Meanwhile, with rod 104 in reset position latch pin 107 is rolled along plate 110 into nesting engagement with notch 108 which has been rotated counterclockwise about pin 113 by virtue of link 64 being pulled back to permit camming roller 111 to move with element 112. Thus, latch plate 110 is positioned to deter motion of reset rod 104 regardless of the position of flanged roller 106 in slotted arm 100. When tailgate 14 returns to the position shown in FIG. 1 the knife is held in the latched position.

In operation, it is important that cutting element 92 is dropped freely without impediment to sever the net by utilizing the force of gravity. This is enhanced by the unique relationship of pin 73 and the ramp portion 125 of slot 74. As control arm 71 moves in a leftward direction, i.e., actuator 61 is retracting element 65, pin 73 (secured to knife side plate 83) becomes free of the confinement of the left end of slot 74 and permits the cutting assembly to pivot about 75 in a counterclockwise direction. Trip latch 120 permits concise timing of the knife drop with a positive unimpeded fall as pin 73 becomes free to travel up ramp 125. Only when lock pin 122 is released from locking notch 125 is the knife permitted to drop. This function can be accurately determined by setting the position at which stop 117 engages collar element 115 to raise trip rod 116 to its phantom position shown in FIG. 6. Until such time the knife is positively latched awaiting the tripping of latch 120, resulting in a clean sudden knife drop at a precisely timed step in the sequence of operation of the control system.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. An agricultural baler for making cylindrical bales of crop material comprising
    a main frame,
    a tailgate pivotally connected to said main frame,
    a sledge assembly mounted on said frame and moveable between bale starting and full bale positions, said sledge assembly includes a plurality of rollers,
    an apron extending around guide means on said tailgate and said main frame, said apron cooperating with said rollers to define a bale forming chamber,
    a net dispensing mechanism mounted adjacent said rollers for dispensing a web of net material into said bale forming chamber, said dispensing means including means for moving it into operative condition during which said net material is circumferentially wrapped around crop material in said bale forming chamber to form a cylindrical bale, and
    a net severing assembly including cutting means for operatively engaging said web of net upstream of the point of its entry into said chamber after the crop material has been wrapped to form said bale, said severing assembly mounted above said web of net and said cutting means operatively engages said web of material by dropping into said web, the improvement comprising
    control means for preventing said severing means from operating under conditions where said dispensing mechanism is in said operative condition, said control means comprise first link means operatively coupled to said means for moving said dispensing mechanism, second link means operatively coupled to said net severing assembly, actuator means coupled to said first link means for moving said dispensing means to said operative condition, said second link means includes means for preventing said cutting means from dropping, said actuator means coupled to said second link means in a manner whereby said cutting means is deterred by said preventing means from engaging said net during said operative condition, said means for preventing including a plate with a generally transverse slot, and a pin extending laterally from said cutting means through said slot, whereby vertical movement of said pin is blocked during said operative condition of said dispensing means.

2. An agricultural baler for making cylindrical bales of crop material comprising a main frame, a tailgate pivotally connected to said main frame, said tailgate adapted to rotate between closed and open positions relative to said mainframe, guide means on said tailgate and said main frame, an apron extending around said guide means on said tailgate and said main frame, to define a bale forming chamber that discharges bales formed therein rearwardly under conditions where said tailgate is rotated to its open position, a dispensing mechanism mounted on said main frame for dispensing a web of net material into said bale forming chamber, said dispensing means including means for moving it into operative condition during which said net material is circumferentially wrapped around crop material in said bale forming chamber to form a cylindrical bale, and a net severing assembly including cutting means for operatively engaging said web of net upstream of the point of its entry into said chamber after said crop material has been wrapped to form said bale, said severing assembly mounted above said web of net and said cutting means operatively engages said web of material by dropping into said web, the improvement comprising control means for preventing said severing means from operating under conditions where said dispensing mechanism is in said operative condition, said control means comprise first link means operatively coupled to said means for moving said dispensing mechanism, second link means operatively coupled to said net severing assembly, actuator means coupled to said first link means for moving said dispensing means to said operative condition, said second link means includes means for preventing said cutting means from dropping, said actuator means coupled to said second link means in a manner whereby said cutting means is deterred by said preventing means from engaging said net during said operative condition, said means for preventing including a plate with a generally transverse slot, and a pin extending laterally from said cutting means through said slot, whereby vertical movement of said pin is blocked during said operative condition of said dispensing means.

3. An agricultural baler for making cylindrical bales of crop material comprising a main frame, a tailgate pivotally connected to said main frame, a sledge assembly mounted on said frame and moveable between bale starting and full bale positions, said sledge assembly includes a plurality of rollers, an apron extending around guide means on said tailgate and said main frame, said apron cooperating with said rollers to define a bale forming chamber, a net dispensing mechanism mounted adjacent said rollers for dispensing a web of net material into said bale forming chamber, said dispensing means including means for moving it into operative condition during which said net material is circumferentially wrapped around crop material in said bale forming chamber to form a cylindrical bale, and a net severing assembly including cutting means for operatively engaging said web of net upstream of the point of its entry into said chamber after the crop material has been wrapped to form said bale, said severing assembly mounted above said web of net and said cutting means operatively engages said web of material by dropping into said web, the improvement comprising control means for preventing said severing means from operating under conditions where said dispensing mechanism is in said operative condition, said control means comprise first link means operatively coupled to said means for moving said dispensing mechanism, second link means operatively coupled to said net severing assembly, actuator means coupled to said first link means for moving said dispensing means to said operative condition, said second link means includes means for preventing said cutting means from dropping, said actuator means coupled to said second link means in a manner whereby said cutting means is deterred by said preventing means from engaging said net during said operative condition, said means for preventing including stop means affixed to and extending from said cutting means, said stop means having a predetermined path of travel, and means disposed in said path and obstructing said stop means during operative condition of said dispensing means.

4. An agricultural baler for making cylindrical bales of crop material comprising a main frame, a tailgate pivotally connected to said main frame, said tailgate adapted to rotate between closed and open positions relative to said mainframe, guide means on said tailgate and said main frame, an apron extending around said guide means on said tailgate and said main frame, to define a bale forming chamber that discharges bales formed therein rearwardly under conditions where said tailgate is rotated to its open position, a dispensing mechanism mounted on said main frame for dispensing a web of net material into said bale forming chamber, said dispensing means including means for moving it into operative condition during which said net material is circumferentially wrapped around crop material in said bale forming chamber to form a cylindrical bale, and a net severing assembly including cutting means for operatively engaging said web of net upstream of the point of its entry into said chamber after said crop material has been wrapped to form said bale, said severing assembly mounted above said web of net and said cutting means operatively engages said web of material by dropping into said web, the improvement comprising control means for preventing said severing means from operating under conditions where said dispensing mechanism is in said operative condition, said control means comprise first link means operatively coupled to said means for moving said dispensing mechanism, second link means operatively coupled to said net severing assembly, actuator means coupled to said first link means for moving said dispensing means to said operative condition, said second link means includes means for preventing said cutting means from dropping, said actuator means coupled to said second link means in a manner whereby said cutting means is deterred by said preventing means from engaging said net during said operative condition, said means for preventing including stop means affixed to and extending from said cutting means, said stop means having a predetermined path of travel, and means disposed in said path and obstructing said stop means during operative condition of said dispensing means.

* * * * *